(No Model.) 2 Sheets—Sheet 1.
C. H. HILL.
Apparatus for Drying Fruit.
No. 237,530. Patented Feb. 8, 1881.
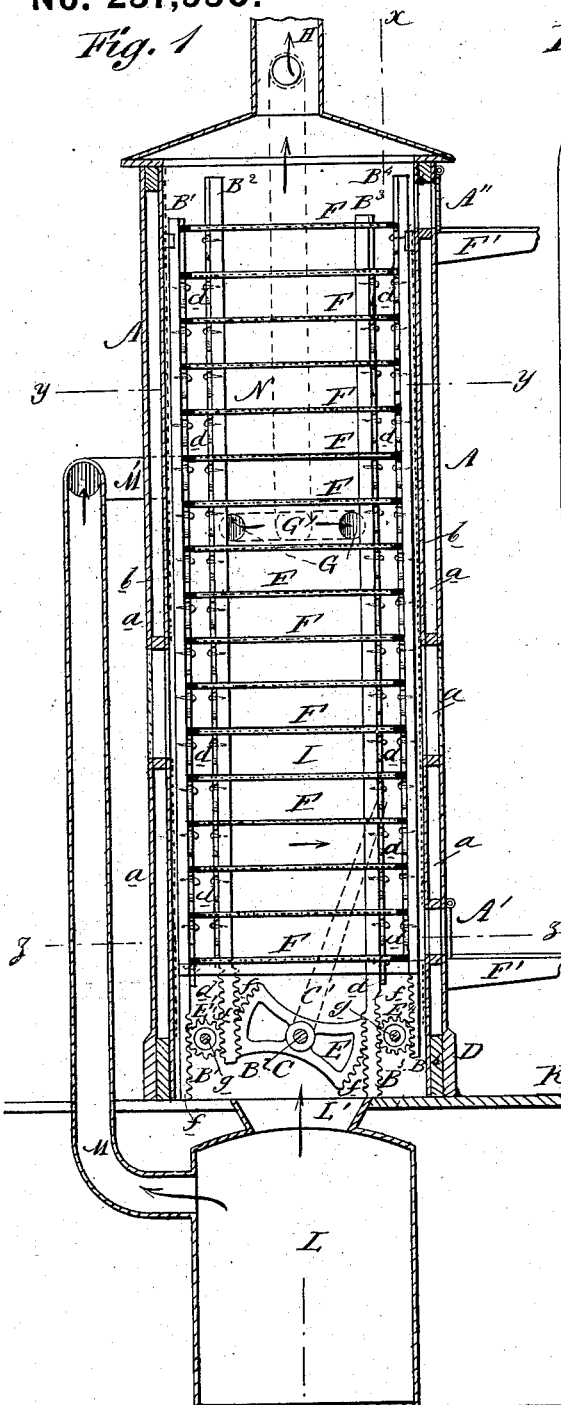
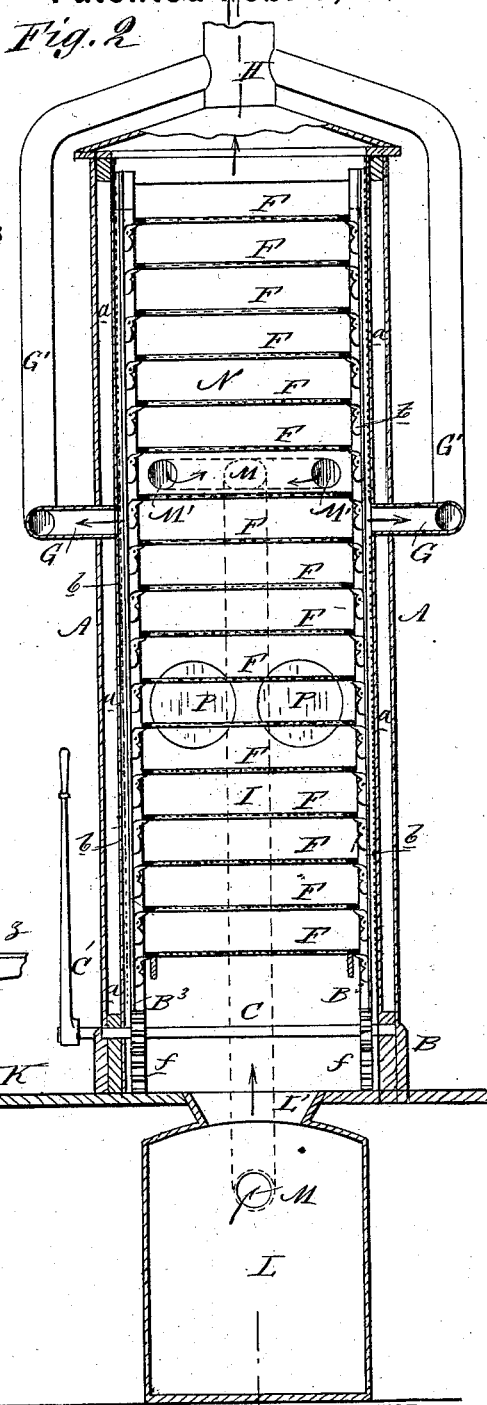
WITNESSES:
C. Neveux
C. Sedgwick
INVENTOR:
C. H. Hill
BY Munn & Co.
ATTORNEYS.

(No Model.) 2 Sheets—Sheet 2.
C. H. HILL.
Apparatus for Drying Fruit.
No. 237,530. Patented Feb. 8, 1881.
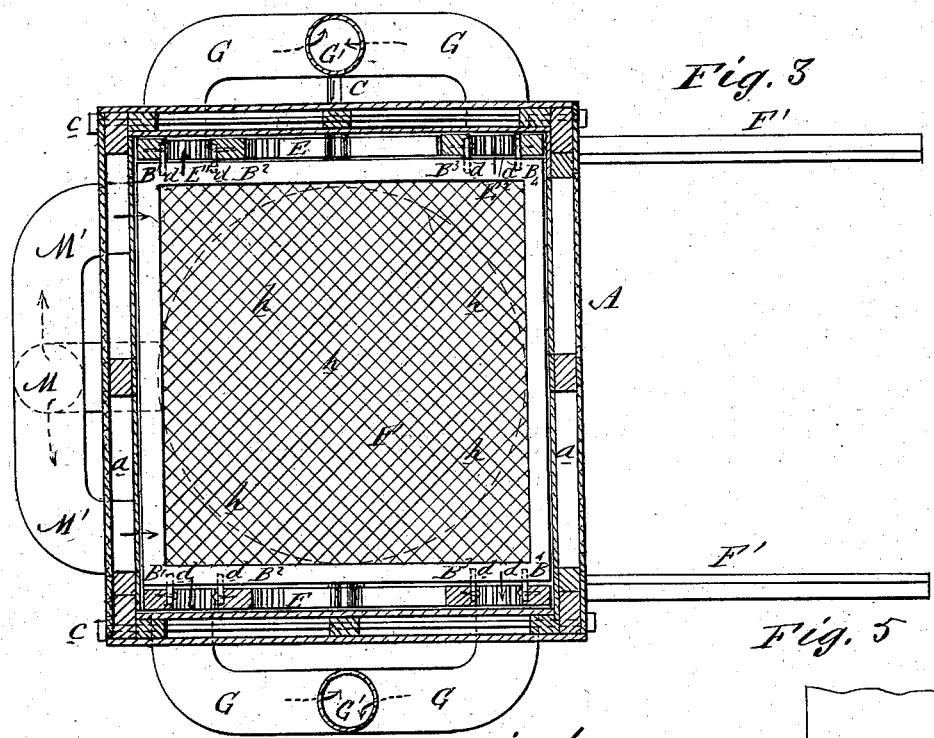
Fig. 3
Fig. 5
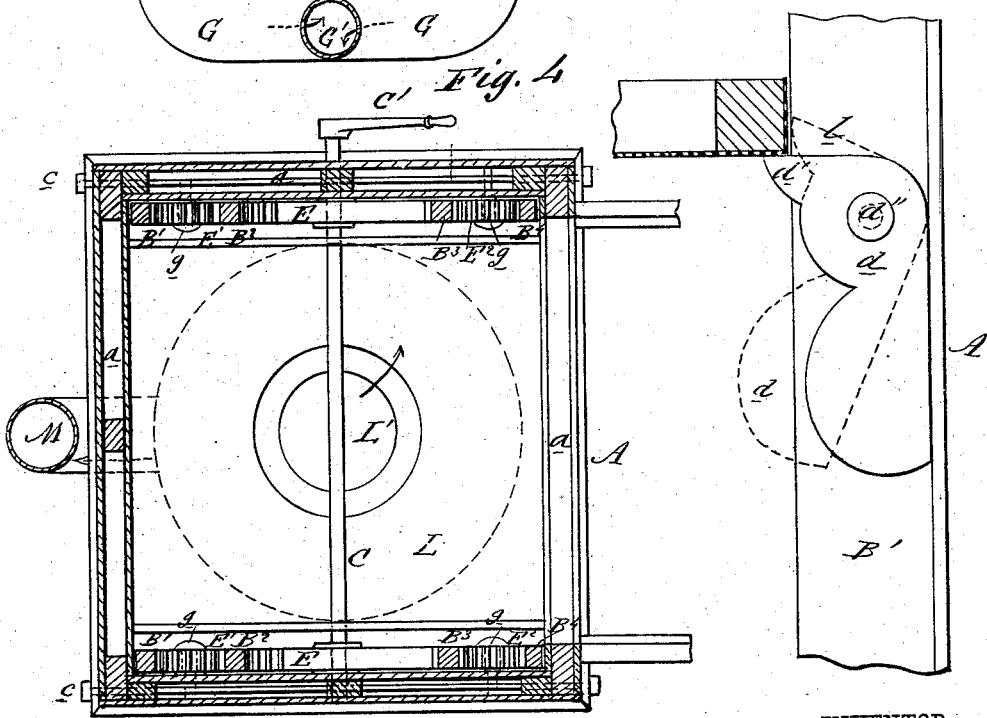
Fig. 4
WITNESSES:
C. Neveux
C. Sedgwick
INVENTOR:
C. H. Hill.
BY Munn & Co.
ATTORNEYS.

UNITED STATES PATENT OFFICE.

CHARLES H. HILL, OF SODUS POINT, NEW YORK.

APPARATUS FOR DRYING FRUIT.

SPECIFICATION forming part of Letters Patent No. 237,530, dated February 8, 1881.

Application filed August 14, 1880. (No model.)

*To all whom it may concern:*

Be it known that I, CHARLES H. HILL, of Sodus Point, in the county of Wayne and State of New York, have invented a new and Improved Apparatus for Drying Fruit and Vegetables, of which the following is a specification.

The object of this invention is to provide an improved process and apparatus for desiccating fruit and vegetables by means of artificial heat.

Figure 1 is a vertical sectional elevation of the device on line $w$ $w$, Fig. 2. Fig. 2 is a vertical sectional elevation on line $x$ $x$, Fig. 1. Fig. 3 is a cross-section on line $y$ $y$, Fig. 1. Fig. 4 is a cross-section on line $z$ $z$, Fig. 1. Fig. 5 is an enlarged side elevation, partly in section, showing the manner of the engagement of a gravity-catch with a tray.

Similar letters of reference indicate corresponding parts.

In the drawings, A represents the double case or walls of the drier, provided with an air-space, $a$, between the walls, and a lining, $b$, of asbestus, paper, or other suitable material, to prevent radiation of heat from within said drier. This case A is of rectangular cross-section, and is preferably constructed of suitable boards and timbers held together by tie-bolts $c$ $c$.

Within the device, on two opposite sides thereof, and extending from the bottom nearly to the top, are arranged the upright parallel standards $B'$ $B^2$ $B^3$ $B^4$, four on each side, making eight in all, each of which is provided with a vertical row of catches, $d$ $d$, pivoted thereto and swinging freely. Said standards $B'$ $B^2$ $B^3$ $B^4$ have their lower extremities transversely toothed or grooved, as shown at $f$, the extremities of the inmost standards, $B^2$ $B^3$, being toothed or grooved on opposite faces.

C is a rod or shaft passed transversely through the device, having suitable bearings in the base D, and a crank, $C'$, on its outer end to serve as a handle. On said shaft C are keyed the two segmental toothed pinions E E, one of said pinions E being fixed between the two inmost standards, $B^2$ $B^3$, on the opposite sides of the case A, and in gear with their toothed extremities. Between these standards $B^2$ $B^3$ and the outermost standards, $B'$ $B^4$, the pinions $E'$ $E''$ are journaled on studs $g$ $g$, and are engaged on one side with the outer toothed faces of the innermost standards, $B^2$ $B^3$, and on the other hand with the outermost standards, $B'$ $B^4$, so that when the crank-handle $C'$ is rocked or moved between the standards $B^2$ $B^3$ in the direction indicated by the arrow, Fig. 1, the standards $B^2$ will be elevated with the effect of depressing the standards $B'$ by means of the motion transmitted through the corresponding pinions $E'$, while simultaneously the standards $B^3$ will be depressed by the opposite ends of the pinions E, and the standards $B^4$ will be correspondingly elevated by the movements of the pinion $E''$, and as the motion of the said segmental pinion E is reversed the standards $B'$ $B^3$ will be elevated and the standards $B^2$ $B^4$ be depressed. Thus it will be seen that at each reciprocation of the segmental pinion E the standards $B'$ $B^3$ move up and down alternately with the standards $B^2$ $B^4$.

The catches $d$ $d$ have curved front edges and projecting noses $d'$ $d'$, and are pivoted by pins $d''$ $d''$, one above another, on the several standards, in such a manner that said noses $d'$ $d'$ project beyond the faces of said standards $B'$ $B^2$ $B^3$ $B^4$, while their straight back edges bear against the inner face of the case A, so that the straight tops of said catches $d$ $d$ cannot be inclined forward below a horizontal line.

F is a fruit-tray having a rectangular frame, of wood or other suitable material, and galvanized iron-wire netting stretched upon the under side thereof and suitably fastened thereto. The wires $h$ $h$ in this netting are stretched diagonally in the frame for the purpose of holding it perfectly rigid and square.

At the front of the case A and near the base thereof is a door, $A'$, through which the trays F are introduced into the drier, and at the top of the device is a door, $A''$, for the withdrawal of said trays F. At each door and extending within the drier are guides or supports $F'$, for facilitating the introduction and withdrawal of said trays F.

About half-way up the pipes G are entered into opposite sides thereof, and each is connected with an upright pipe, $G'$, which extends upward and enters the main ventilating-pipe H, whereby the steam or moisture arising from the drying fruit or vegetables is exhausted and conducted to the open air. The interior of the drier below these pipes G is termed the "evaporating-chamber" I.

K is the floor on which the drier rests, and beneath this floor K is the hot-air chamber L, which has an aperture, L', in its top, opening into the base of the drier, for the introduction of hot air therein to dry the fruit or vegetables on the trays F. Connected with the hot-air chamber L is a pipe, M, that extends upward and unites with a T-pipe, M', whose branches enter a side of the drier a short distance above the pipes G, to convey into the part N of the drier, which is called the "superheating-chamber," hot air for completing the desiccation of the said fruit or vegetables. The interior of the drier being raised to a suitable temperature by a fire in the hot-air chamber L, a tray, F, is introduced through the door A', so that the opposite sides of said tray F shall rest on four of the catches $d$ $d$—for instance, on the catches $d$ $d$ that are pivoted on the standards $B^2$ $B^4$. The crank-handle C' is then moved so as to elevate said standards $B^2$ $B^4$, and thereby the tray F, the distance between the top of one catch to a little above the top of the next highest catch $d$, and as said tray F is elevated it comes in contact with the projecting noses of the said catches $d$, and causes the said noses to rotate in the direction of the dotted line $l$, Fig. 5, until they pass within the vertical planes of the standards to which they are attached, and then as the said tray F is elevated a little higher these catches $d$ return to the primary positions by gravity, their lower portions being heavier than that portion of them above their pivoting-points. As the standards $B^2$ $B^4$ are elevated the standards B' $B^3$ are depressed so that their lower catches, $d$, are brought with their tops on a level with or a little below the faces of the guides or supports F'. A second tray F being now introduced, the crank-handle C' is moved to its original position with the effect of elevating the standards B' $B^3$, and thereby the second tray F on the catches $d$ of said standards B' $B^3$, and at the same time the standards $B^2$ $B^4$ are depressed so that their lower catches $d$ shall be brought to or below the face of the guides F', and at the commencement of this downward movement of the said standards $B^2$ $B^4$ the first tray F is lodged on the catches $d$ of the standards B' $B^3$ that said tray F had just previously come in contact with; and thus the work may progress, each tray F being elevated one catch $d$ higher at every movement of the crank-handle C'.

In other fruit-driers the fruit or vegetables remain in the same atmosphere of steam, which is caused by the evaporation of the juices in the said fruit or vegetables, until the drying-trays are finally removed from the top of the drier, and this atmosphere has a tendency to steam and cook the fruit and vegetables, rather than simply dry them, and in some driers a portion of the steam will condense and fall back on the partially-dried fruit. Both of these conditions injuriously affect the fruit and vegetables and are carefully to be avoided.

The superiority of my process consists in removing the steam and moisture arising from the drying fruit and vegetables from the drier at the top of the evaporating-chamber I by means of the pipes G, G', and H, so that the fruit and vegetables shall not be exposed to said steam and moisture beyond that point; and it further consists in then subjecting said fruit and vegetables to dry hot air in the superheating-chamber N by means of the pipes M M', that are connected directly with the hot-air chamber L, whereby said fruit and vegetables are thoroughly desiccated by the time they have reached the level of the door A'', through which they are removed on trays F. The remaining moisture evaporated from the fruit and vegetables in the superheating-chamber N passes off through the main ventilating-pipe H. The fruit being thickly spread on the trays and overlapping the sides, the current of hot air from chamber L is greatly retarded and checked, so that a large portion is carried up through pipe M and delivered into the space N at an undiminished temperature and in a very dry condition. On the other hand, the air which has struggled through the moist fruit has become saturated with moisture and lowered in temperature, so that on coming in contact with the lighter air from pipe M it readily discharges through the side pipes, G G'.

This drier is designed to be in a two-story building, the hot-air furnace being set in the basement thereof, and the trays containing the fruit and vegetables being put in on the first floor and removed on the second floor above the point where the hot air from the furnace enters the superheating-chamber. I also provide for doors (not shown) on the back of the superheating-chamber, above the second floor, for access to the trays, should the contents thereof become dry enough before they have reached the door in front.

I place a sheet-metal screen on the guides or supports, immediately over the aperture of the hot-air chamber, whenever the heat therefrom is too great for the fruit and vegetables.

I place windows P in a side of the case A, through which to inspect the contents thereof.

An important advantage which this drier possesses over others is, that the standards are so arranged that they balance each other, two pairs of them moving down as the other two pairs are moved up by the same mechanism, thereby consuming but a minimum of power, only power enough being required to overcome the shaft friction of the standards and the weight of the trays and their contents.

The hot air, which ascends through opening L', loses a great proportion of its caloric as it rises through the evaporating-chamber I, and acquires a load of vapor from the moisture of the fruit before it is discharged through the pipes G. As soon as the fruits are raised into the chamber N they are removed from the moistened air, whose heat has been sensibly diminished in doing its work of evaporation, and are carried into a drier and hotter atmosphere, which soon completes the desiccation.

What I claim as new and of my invention is—

1. The combination, with case A, of the parallel standards, arranged on each of two sides, and provided with a vertical row of pivoted catches, $d\ d'$, and grooves $f$, the rock-shaft C, carrying segmental pinions E, and the studs $g$, carrying pinions E', as and for the purpose set forth.

2. The combination, with case A, connected by a bottom opening, L', with the hot-air chamber L, and an elevator carrying trays F, of a pipe, M, connecting at bottom with the hot-air chamber and at top with the space N in the case, and the outlet-pipes G G', connecting the upper part of space I with smoke-pipe H, as and for the purpose specified.

CHARLES H. HILL.

Witnesses:
P. G. LEWIS,
S. B. STUART.